United States Patent
Wu et al.

(10) Patent No.: US 6,256,550 B1
(45) Date of Patent: Jul. 3, 2001

(54) OVERALL EQUIPMENT EFFECTIVENESS ON-LINE CATEGORIES SYSTEM AND METHOD

(75) Inventors: Wen Feng Wu, Hsin-Chu; Ming-Hsiu Hsieh, Taipei Hsien; Pai-Lan Chen; Ching-Ren Chen, both of Hsinchu; Hui-Ping Liu, Hsin-Chu, all of (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 09/131,119

(22) Filed: Aug. 7, 1998

(51) Int. Cl.[7] .............................. G06F 19/00; G06G 7/64
(52) U.S. Cl. .............................. 700/121; 700/83; 700/95; 700/96; 700/100; 700/108; 700/111; 700/213; 705/7; 705/9
(58) Field of Search .............................. 700/121, 95, 96, 700/83, 100, 108, 111, 213; 705/7, 9

(56) References Cited

U.S. PATENT DOCUMENTS

| | | | |
|---|---|---|---|
| 4,719,587 | * 1/1988 | Berte | 700/34 |
| 5,099,431 | * 3/1992 | Natarajan | 700/105 |
| 5,216,613 | * 6/1993 | Head, III | 700/102 |
| 5,282,139 | * 1/1994 | Kobayashi | 700/101 |
| 5,402,350 | 3/1995 | Kline | 364/468 |
| 5,444,632 | 8/1995 | Kline et al. | 364/468 |
| 5,528,510 | * 6/1996 | Kraft | 700/95 |
| 5,612,886 | 3/1997 | Weng | 364/468.07 |
| 5,706,200 | * 1/1998 | Kumar et al. | 700/100 |
| 5,740,429 | * 4/1998 | Wang et al. | 707/104 |
| 5,745,364 | * 4/1998 | Togashi | 700/121 |
| 5,748,478 | * 5/1998 | Pan et al. | 700/90 |
| 5,751,580 | * 5/1998 | Chi | 700/101 |
| 5,818,716 | * 10/1999 | Chin et al. | 700/100 |

OTHER PUBLICATIONS

Robert Leachman "Closed–Loop Measurement of Equipment Efficiency and Equipment CApacity" IEEE p. 115–126 (1995) Advance Semiconductor Manufacturing Conference.*

Guideline for Definition and Measurement of Equipment Reliability Availability and Maintain ability, SEMI International Standard, SEMI E–10–92 p. 61–69 (1993).

Robert C. Leachman, "Closed–Loop Measurement of Equipment Efficiency and Equipment Capacity" IEEEISEMI Advanced Semiconductor Manufacturing Conference, p. 115–126 (1995).

* cited by examiner

*Primary Examiner*—Ayaz Sheikh
*Assistant Examiner*—Frantz B. Jean
(74) *Attorney, Agent, or Firm*—George O. Saile; Stephen B. Ackerman

(57) ABSTRACT

A manufacturing control and reporting method/system for manufacture of semiconductor devices comprises a system for loading a mechanical article handling device in a semiconductor manufacturing system, provides an automatic check-in and changing equipment status to an UP status, automatically checking whether the article handling system is empty, and for automatically changing the system status to an IDLE status. The system provides automatic check-in, and subsequent to processing of the workload by the plant provides track-out followed by automatically checking whether the article handling system is empty. Then the system checking whether a TE has arrived, and the system checks whether the TE has reloaded the article handling system.

2 Claims, 9 Drawing Sheets

FIG. 5

| OEE Function | | MET1 | MET10 | MET11 | MET12 | MET2 | MET3 | MET4 | MET5 | MET6 | MET7 | MET8 | MET9 | AVG |
|---|---|---|---|---|---|---|---|---|---|---|---|---|---|---|
| Overall Equipment | Effectiveness(OEE) | 71.98 | 93.53 | 77.26 | 59.10 | 69.86 | 74.81 | 58.78 | 72.25 | 73.40 | 70.61 | 69.73 | 81.41 | 72.73 |
| Availability | | 82.28 | 86.52 | 88.39 | 76.62 | 85.23 | 83.69 | 65.38 | 78.90 | 75.38 | 80.00 | 77.80 | 80.97 | 80.10 |
| Performance | Efficiency | 88.14 | 108.40 | 88.55 | 77.22 | 82.68 | 90.02 | 90.37 | 92.57 | 97.93 | 89.00 | 89.86 | 101.37 | 91.34 |
| Rate | Efficiency | 105.03 | 112.97 | 96.49 | 85.89 | 91.30 | 96.73 | 109.15 | 96.64 | 102.77 | 95.23 | 97.35 | 105.70 | 99.60 |
| Operation | Efficiency | 83.92 | 95.95 | 91.76 | 89.91 | 90.56 | 93.06 | 82.80 | 95.79 | 95.30 | 93.46 | 92.31 | 95.91 | 91.73 |
| Rate of | Quality | 99.26 | 99.73 | 98.72 | 99.89 | 99.14 | 99.30 | 99.49 | 98.92 | 99.43 | 99.17 | 99.73 | 99.18 | 99.33 |
| Demand | Efficiency | 100.00 | 100.00 | 100.00 | 100.00 | 100.00 | 100.00 | 100.00 | 100.00 | 100.00 | 100.00 | 100.00 | 100.00 | 100.00 |
| PRODUCTIVE | UP | 69.05 | 83.02 | 81.11 | 68.89 | 77.19 | 77.88 | 54.13 | 75.58 | 71.83 | 74.77 | 71.82 | 77.65 | 73.58 |
| TIME | BKUP | 0.00 | 0.00 | 0.00 | 0.00 | 0.00 | 0.00 | 0.00 | 0.00 | 0.00 | 0.00 | 0.00 | 0.00 | 0.00 |
| ENGINEERING | TEST | 4.67 | 0.00 | 0.66 | 0.18 | 0.04 | 0.00 | 7.52 | 0.00 | 0.55 | 0.00 | 0.06 | 0.00 | 1.14 |
| STANDBY L | NO TE | 2.70 | 3.23 | 5.21 | 5.07 | 0.04 | 0.00 | 7.52 | 1.90 | 2.46 | 2.46 | 4.93 | 2.36 | 3.54 |
| O | NO WIP LOAD | 0.80 | 0.00 | 0.00 | 0.30 | 4.19 | 3.27 | 2.71 | 0.04 | 0.00 | 0.00 | 0.00 | 0.00 | 0.00 |
| S | LOST OTHERS | 5.06 | 0.27 | 1.42 | 2.19 | 3.82 | 2.53 | 1.01 | 1.37 | 0.54 | 0.74 | 0.99 | 0.95 | 1.74 |
| W | WAIT PM | 0.00 | 0.00 | 0.00 | 0.00 | 0.00 | 0.00 | 0.00 | 0.00 | 0.00 | 0.00 | 0.04 | 0.06 | 0.01 |
| A | WAIT ENG | 2.03 | 0.85 | 1.00 | 2.49 | 0.48 | 1.29 | 1.26 | 2.19 | 1.92 | 4.43 | 2.05 | 1.92 | 1.83 |
| I | WAIT OCAP | 0.26 | 0.00 | 0.00 | 0.00 | 0.00 | 0.00 | 0.28 | 0.39 | 0.04 | 0.00 | 0.14 | 0.16 | 0.11 |
| T | WAIT OTHERS | 5.26 | 4.23 | 2.42 | 3.35 | 3.86 | 4.39 | 1.64 | 3.18 | 2.67 | 6.42 | 2.18 | 3.72 | 3.61 |
| SCHEDULED M | EQ OTHER CHAM | 0.00 | 0.00 | 0.00 | 0.00 | 0.00 | 0.00 | 0.00 | 0.00 | 0.00 | 0.00 | 0.00 | 0.00 | 0.00 |
| DOWN TIME H | TURN OTHER TYP | 0.00 | 0.00 | 0.00 | 0.00 | 0.00 | 0.00 | 0.00 | 0.00 | 0.00 | 0.00 | 0.00 | 0.00 | 0.00 |
| | PM | 3.48 | 3.33 | 2.07 | 3.01 | 3.52 | 3.90 | 9.34 | 6.29 | 9.03 | 4.40 | 5.90 | 5.45 | 4.98 |
| | MON | 4.72 | 5.26 | 5.88 | 5.43 | 6.14 | 5.00 | 7.94 | 6.53 | 4.91 | 4.94 | 6.96 | 5.90 | 5.80 |
| UNSCHEDULED | DOWN | 0.88 | 0.28 | 1.33 | 5.38 | 0.00 | 1.82 | 14.32 | 2.09 | 3.11 | 0.42 | 4.83 | 0.87 | 2.94 |
| DOWNTIME | FAC | 1.33 | 0.45 | 0.55 | 4.49 | 0.81 | 0.80 | 0.00 | 0.25 | 2.78 | 0.99 | 2.70 | 0.96 | 1.34 |
| NON-SCHEDULE | OFF | 0.00 | 0.00 | 0.00 | 0.00 | 0.00 | 0.00 | 0.00 | 0.00 | 0.00 | 0.00 | 0.00 | 0.00 | 0.00 |

| Best WPH Function | | | | | | | | | | | | | |
|---|---|---|---|---|---|---|---|---|---|---|---|---|---|
| REC-PID | MET1 WPH | GAP | MET10 WPH | GAP | MET11 WPH | GAP | MET12 WPH | GAP | MET2 WPH | GAP | MET3 WPH | GAP | MET4 WPH | GAP |
| 1161 | 19.299 | | 018.239 | 1.060 | | | 17.442 | 1.852 | 16.612 | 2.687 | 17.572 | 1.727 | 17.577 | 1.722 |
| 1262 | 19.113 | | 018.155 | 0.958 | 17.987 | 1.126 | 17.442 | 1.671 | 16.603 | 2.51 | 17.55 | 1.563 | 17.608 | 1.505 |
| 2146 | 14.857 | 0 | | | | | | | | | | | | |
| 2154 | | | 15.149 | 0.582 | 15.137 | 0.594 | | | 13.996 | 1.735 | 15.731 | 0 | 14.817 | 0.914 |
| 2246 | | | | | | | | | | | | | | |
| 2255 | | | | | | | | | | | | | | |
| 2256 | | | 15.060 | 2.180 | 14.948 | 2.292 | 14.519 | 2.721 | 14.576 | 2.664 | 14.576 | 2.664 | | 2.661 |
| 2260 | | | | | | | | | | | | | | |
| 2266 | 14.904 | 0 | | | | | | | | | | | | |
| 3152 | | | 15.163 | 4.22 | 15.101 | 4.282 | | | | | | | | |
| 3153 | | | | | | | | | | | | | | |
| 3154 | | | | | | | | | | | | | | |
| 3252 | | | 15.109 | 0.121 | 15.054 | 0.176 | | | | | | | | |
| 3253 | | | | | | | | | | | | | | |
| 3254 | | | | | | | | | | | | | | |
| 3353 | | | | | | | | | | | | | | |
| 3354 | | | 18.026 | 0 | | | | | | | | | | |
| 3356 | | | 15.023 | 0 | 14.881 | 0.142 | | | | | | | | |
| 3366 | | | 18.072 | 0.001 | 17.899 | 0.174 | | | | | | | | |

OVERALL EQUIPMENT EFFECTIVENESS ON-LINE CATEGORIES SYSTEM AND METHOD

BACKGROUND OF THE INVENTION

1. Field of the Invention

This invention relates to processes for control of the process of manufacturing semiconductor chips and more particularly to control of production in an integrated circuit manufacturing process.

2. Description of Related Art

See "Guideline for Definition and Measurement of Equipment Reliability, Availability and Maintainability, SEMI International Standards, SEMI E-10-92, pp 61–69 (1993); and Robert C. Leachman, "Closed-loop Measurement of Equipment Efficiency and Equipment Capacity", IEEE/SEMI Advanced Semiconductor Manufacturing Conference, pp. 115–126 (1995).

U.S. Pat. No. 5,528,510 of Kraft for "Equipment Performance Apparatus and Method" describes a process control system and a method for yielding improvement in product throughput by using tuned model process control using product and machine parametric data, process control via real time critical equipment transient monitoring, process windowing of critical equipment of equipment transients and machine/product parametric data correlation.

U.S. Pat. No. 5,612,886 of Weng for "Method and System for Dynamic Dispatching in Semiconductor Manufacturing Plants" describes WIP management.

See U.S. Pat. No. 5,402,350 of Kline which shows a method for "Scheduling for Multi-Task Manufacturing Equipment" and U.S. Pat. No. 5,444,632 of Kline et al. for "Apparatus and Method for Controlling and Scheduling Processing Machines".

SUMMARY OF THE INVENTION

This invention provides the features as follows:
1. Provide a useful metric (set of measurement parameters) for performance analysis.
2. OEE provides an excellent way for chip manufacturers and equipment suppliers to understand and track productivity and find ways to improve it.
3. When OEE is implemented in a manufacturing area, there are major savings in investments related to bottleneck machines.

In accordance with this invention, a manufacturing control and reporting method and system for manufacture of semiconductor devices comprises as follows:
   a system for loading a mechanical article handling device in a semiconductor manufacturing system,
   means for providing an automatic check-in and changing equipment status to an UP status,
   means for automatically checking whether the article handling system is empty, and
   means for automatically changing the system status to an IDLE status.
   Preferably, the system provides automatic check-in, and subsequent to processing of the workload by the plant provides track-out followed by automatically checking whether the article handling system is empty,
   then the system checking whether a TE has arrived, and the system checking whether the TE has reloaded the article handling system.

BRIEF DESCRIPTION OF THE DRAWINGS

The foregoing and other aspects and advantages of this invention are explained and described below with reference to the accompanying drawings, in which:

FIG. 5 shows a computer screen of an OEE Reporting System operated upon a personal computer based system employed in controlling the systems of FIGS. 1 and 2.

FIG. 6 shows another computer screen of the OEE Reporting System which provides an OEE Report help to trace productivity.

FIG. 9 shows another computer screen of the OEE Reporting System which provides a computer screen which has the data as follows: "Best WPH Subsystem" help to find improvement opportunity of EQP & recipe setting Function.

DESCRIPTION OF THE PREFERRED EMBODIMENT

Figure 1:
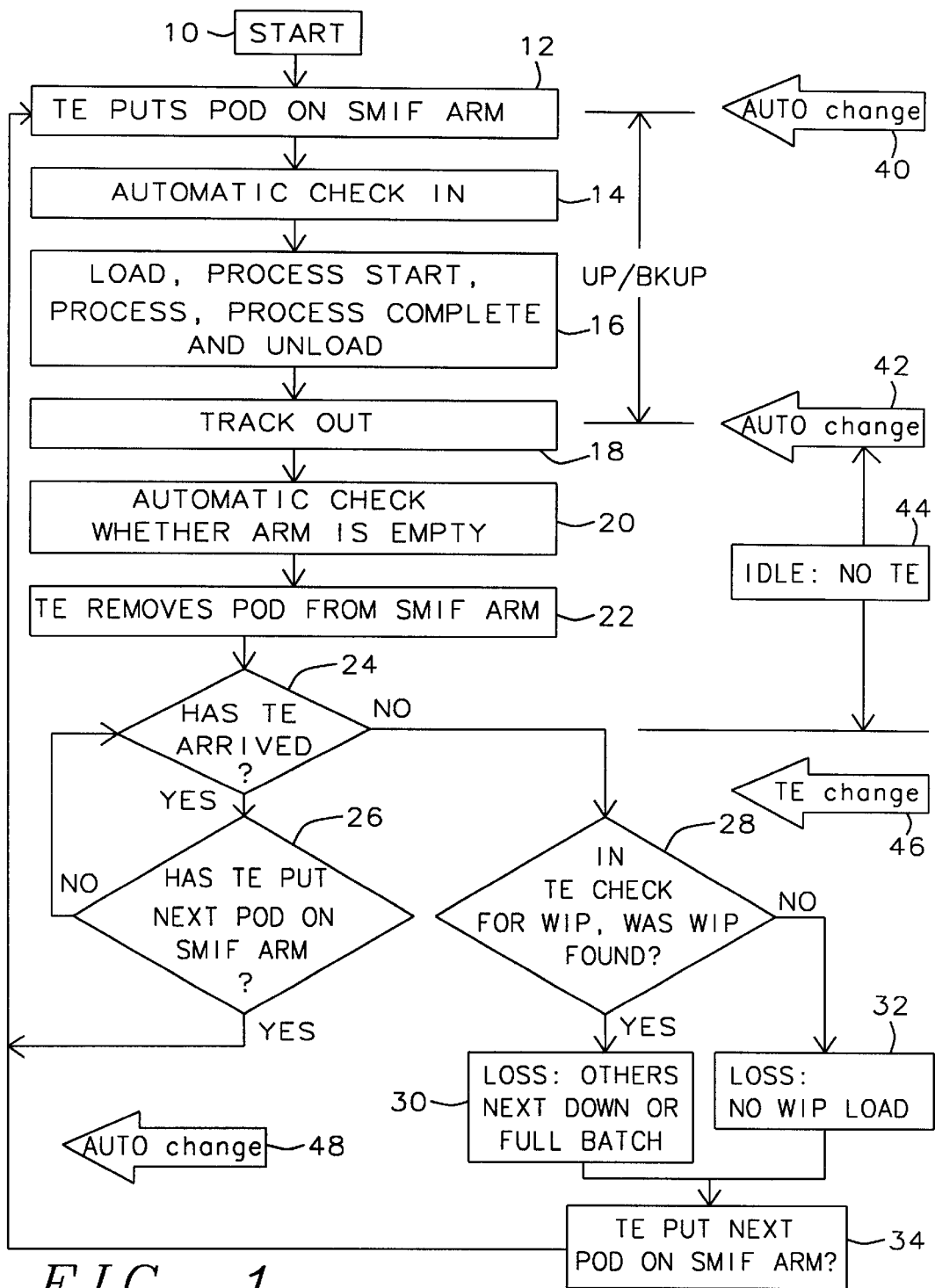
FIG. 1 shows a flowchart of a computer program in accordance with this invention which is resident in factory control computer system which is a part of the overall computer system.

| Definitions | |
|---|---|
| OEE: | Overall Equipment Effectiveness |
| EQP: | Equipment |
| UP: | Equipment process (productive) |
| BKUP: | Equipment process (productive) time, but production is allocated to another module or fab causing a BacKUP in this module or fab. |
| TE: | Technical Employee: EQP Operator |
| NO TE: | EQP is in standby time due to unavailability |

-continued

| Definitions | |
|---|---|
| UNLOAD/LOAD: (IDLE): | of TE (operator) to load/unload wafers. |
| WIP: | Work In Process. |
| NO WIP LOAD: | EQP standby time due to no Wafers. (WIP=) in production. |
| LOST OTHERS: | EQP standby time due to the fact that downstream equipment is down or because of waiting for a full batch of Wafers. |
| WAIT PM: | Time of EQP WAITing for equipment engineer to perform, Preventive Maintenance |
| WAIT ENG: | Time EQP waiting for troubleshooting by equipment/process ENGineer |
| WAIT OCAP: | Time of EQP waiting due to Out of Control for Action Procedure (SPC) |
| WAIT OTHERS: | Time of EQP waiting for anything else. |
| Casette: | Container for Semiconductor Wafers to be used in automatic material handling for manufacturing process. |
| POD: | Container for Cassettes filled with semiconductor wafers. |
| TEST: | Engineering time |
| MFGHOLD: | Force chamber to be down due to another chamber down in Cluster tool (Multi-chamber EQP) = EQ another chamber up |
| Turn to: another type: | This has no meaning for OEE (just for accounting purposes) |
| PM: | time of preventive maintenance |
| MON: | time of confirming EQP is workable |
| DOWN: | Hardware-related downtime. |
| FAC: | Facilities-related downtime. |
| OFF: | Shutdown (non-scheduled time). |
| track in: | Interface sends information to shop floor control system when operator loads lot into production. |
| track out: | Interface sends information to shop floor control system when operator removes lot from production. |

-continued

| Definitions | |
|---|---|
| SAM: | Interface (Smart Arm Master) |
| Rework Qty: | Quantity of work to be REWORKed. |
| Scrap Qty: | Scrap quantity. |
| Track in Qty: | Quantity of lots loaded into system. |
| T_WPH: | Theoretical throughput measured-Wafers/Hour. |
| PROMIS: | Data Processing System for Shopfloor control system |
| SMIF: | Standard Mechanical InterFace article handling device system and system as in U.S. Pat. No. 5,669,508, commonly assigned, of Chen-Chin Chen and Kuei-Lung Chou for "Pod Carrier Function Expansion by Adding a Fixture" and U.S. Pat. No. 5,611,452 of Bonora et al. for "Sealable Transportable Container Having Improved Liner" |
| SMIF arm: | Interface hardware for operator to load/unload wafers into and from SMIF |
| Eff. | Efficiency |
| AV. | Availability |

In the current state of the art, the current situation is as follows:

1. OEE (Overall Equipment Effectiveness) is the percentage of time that the equipment is being used to produce wafers that are going to be shipped to a customer.
2. Weakness of current situation:
    2.1 UP time can't stand for actual effectiveness of EQP:
    2.1.1 After TRACK OUT, EQP status is still "UP"
    2.1.2 Losses due to EQP idle are not included.
    2.1.3 Losses due to scrap and rework are not included.
    2.2 Can't trace productivity:
    Definition of EQP status (e.g. UP, WAIT, LOST) is not sufficient.
3. There is a trend to adoption of OEE in semiconductor manufacturing.
    1. OEE Formula in accordance with this invention.

$$\text{OEE} = \text{AVLBLTY} * \begin{bmatrix} \text{Performance} \\ \text{Eff.} \end{bmatrix} * \begin{bmatrix} \text{Rate of} \\ \text{Quality} \end{bmatrix} * \begin{bmatrix} \text{Demand} \\ \text{Eff.} \end{bmatrix} \quad (1)$$

$$\text{OEE} = \text{AVLBLTY} * \begin{bmatrix} \text{Rate} \\ \text{Eff.} \end{bmatrix} * \begin{bmatrix} \text{Operation} \\ \text{Eff.} \end{bmatrix} * \begin{bmatrix} \text{Rate of} \\ \text{Quality} \end{bmatrix} * \begin{bmatrix} \text{Demand} \\ \text{Eff.} \end{bmatrix} \quad (2)$$

$$1.1 \ \text{AVLBLTY} = \frac{\text{UP} + \text{BKUP} + \text{TEST} + \text{LOST} + \text{IDLE}}{\text{total} - \text{OFF}} \quad (3)$$

$$\text{1.2 Performance Eff.} = \frac{\text{UP move} + \frac{\text{BKUP move}}{\text{UP} + \text{BKUP}}}{\text{T\_WPH}} \quad (4)$$

$$\text{1.3 Operation Eff.} = \frac{\text{UP} + \text{BKUP}}{\text{UP} + \text{BKUP} + \text{TEST} + \text{LOST} + \text{IDLE}} \quad (5)$$

$$\text{1.4 Rate of Quality} = 1 - \frac{(\text{rework QTY} + \text{scrap Qty}) * (1/\text{WPH})}{[\text{track in }\%* (1/\text{WPH})]} \quad (6)$$

$$\text{1.5 Demand Efficiency} = 1 \quad (7)$$

1.6 IDLE : auto-count EQP waiting for TE 1.7 Rework & Scrap Qty:

the invalid production is possibly caused by: 1.7.1 Upstream processing due to no quality inspection point between previous workstation and current workstation.

1.7.2 Downstream processing and ever processed by current workstation.

1.7.3 Current workstation

2. Data Categories

| | |
|---|---|
| Availability (AVLBLTY) | |
| Performance Efficiency | |
|   Rate Efficiency | |
|     Operating Efficiency | |
| Rate of Quality | |
| Demand Efficiency | |
| PRODUCTIVE | UP |
| TIME | BKUP |
| STANDBY | LOST |
| | NOTEUNLOAD |
| | LOAD |
| | NO WIP LOAD |
| | LOST OTHERS |
| | WAIT |
| | WAIT PM |
| | WAIT ENG |
| | WAIT OCAP |
| | WAIT OTHERS |
| ENGINEERING | TEST |
| SCHEDULED | MFG HOLD |
| DOWNTIME | EO Another Chamber UP |
| | Turn to Another type |
| | PM |
| | MON |
| UNSCHEDULED | DOWN |
| DOWNTIME | FAC |
| NON-SCHEDULE | OFF |

3. Up/BKUP Comparison

| | | |
|---|---|---|
| | up | |
| | before OEE | |
| pod arrives | -->load cassette-->procees-->unload cassette | -->pod remove-->pod arrive -- |
| | after OEE | |
| | up | idle(NO_TE) |

4. EQP Status Transition Flowchart

Referring to FIG. 1, a flowchart is shown of a computer program in accordance with this invention which is resident in factory control computer system 70 which is a part of the overall computer system 50 starts in block 10 and leads to block 12, where the TE (Technical Employee: EQP Operator) puts the pod on the SMIF arm (of the article handling device.)

Figure 2:
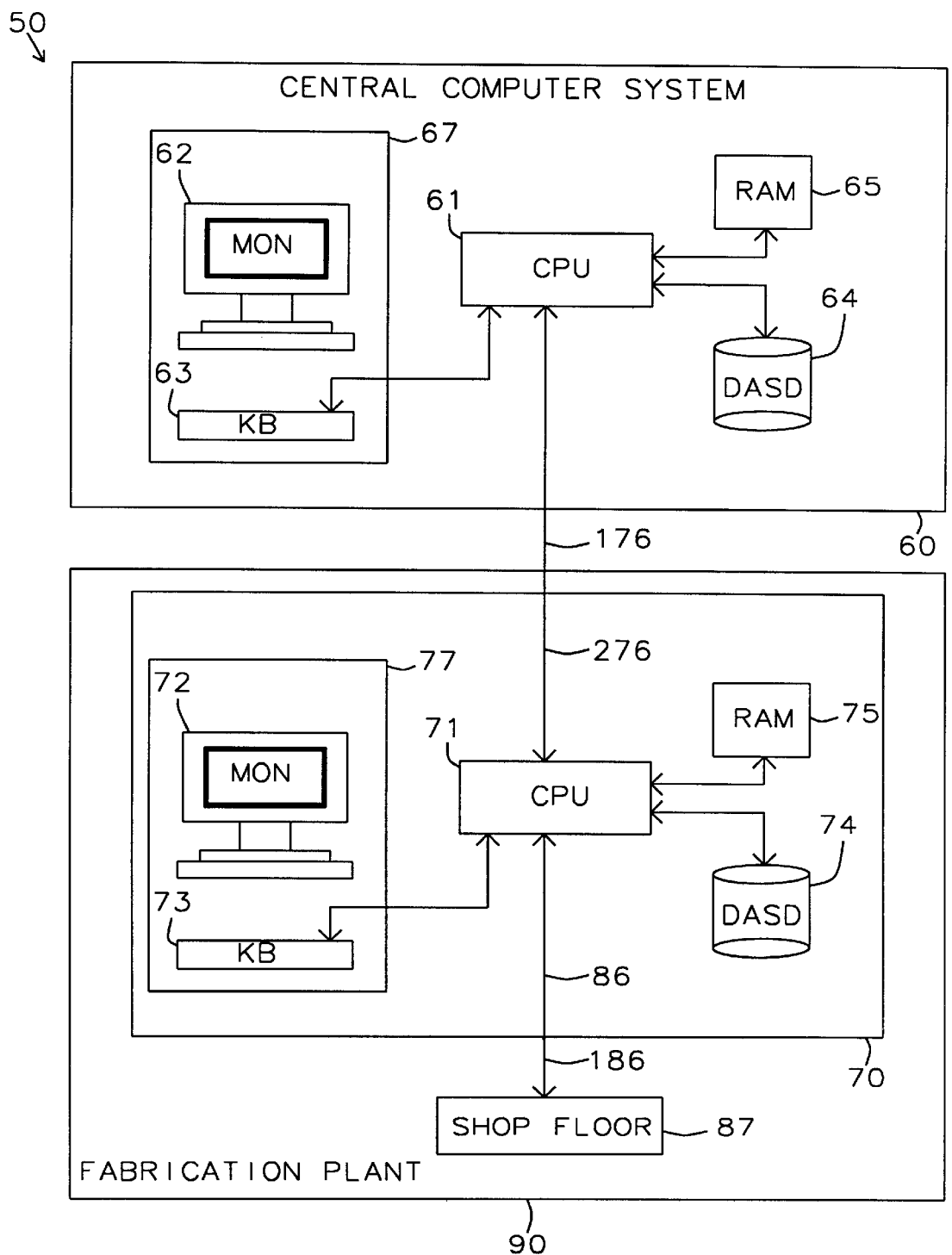
FIG. 2 shows the computer system employed to control a fabrication plant in accordance with the present invention.

Block 12 is an "AUTO change" phase of operation of the system as indicated by block 40, which begins the UP/BKUP phase of the operation of the system wherein computer automated materials handling and processing commences under control of the factory control computer system 70 in FIG. 2.

Next, in step 14, "automatic check-in" of the work loaded into the automated manufacturing plant occurs under control of factory control computer system 70.

Then the factory operates to perform the functions include in block 16 comprising the steps as follows:

Load

Process Start

Process

Process Complete

Unload

Next, the system proceeds to block 18 which is the "track-out" function in which the interface sends information to shop floor control system 87 in FIG. 2, when the operator removes a lot from production.

Block 18 is another "AUTO change" phase of operation of the system as indicated by block 42, which ends the UP/BKUP phase of the operation of the system wherein computer automated materials handling and processing commences under control of the computer system 70 in FIG. 2.

Block 42 also designates the beginning of the IDLE: NO TE phase 44 of operation of the system.

In block 20 Auto check whether the SMIF arm is empty.

In block 22 removes the pod from the SMIF arm.

In decision block 24, the system 70 determines whether the TE has arrived based upon an input provided by the TE to the system 50.

Then the system calls for the TE to remove the pod from the SMIF arm, so the SMIF arm is empty. This marks the end of the IDLE: NO TE phase 44 of operation of the system.

In block 24, the factory control system 70 checks to determine whether the TE has arrived?

If YES, then the system goes on to test blocks 26 and 28. If NO, then as indicated by line 38 the result is that the system goes to block 28 as described below.

In block 26, the factory control system 70 checks the shop floor 87 to determine whether the TE put the next pod on the SMIF arm?

If NO, the block 26 loops back to block 24 to determine whether the TE has arrived? If YES, the program loops back to block 12 and commences the process for another pod. This represents another "AUTO change" as indicated by block 48.

Block 46 indicates a "TE change" phase of operation of the system at the input of block 28.

In block 28, the factory control system 70 determines whether a TE check for WIP has indicated whether there was any WIP found?

If YES, there is WIP, the block 30 a report of the "LOSS: Others Next Down or Full Batch" function is performed by the system 70. As stated above, LOST OTHERS is defined as a condition in which EQuipment (EQP) is waiting during a standby time period due to the fact that downstream equipment is down or because of waiting for a full batch of Wafers. Then the system goes on to block 34.

If NO WIP in block 28, the factory control system 70 the LOSS: NO WIP Load function is performed by the system 70 and the program goes on to block 34.

In block 34, the system generates a call for a check as to whether the TE has put the next pod on the SMIF arm? After block 34, line test 26, the system loops back to block 12.

FIG. 2 shows the computer system 50 employed to control a fabrication plant in accordance with the present invention. System 50 includes a central computer system 60 which comprises a CPU 61, a terminal 67 with monitor 62 and keyboard 63 connected to the CPU 61 or receiving/sending data respectively from/to the CPU 61. A random access memory 65 and a DASD 64 associated with the CPU 61 are shown connected for bidirectional communication with CPU 61.

Line 76 connects from CPU 61 to line 176 which connects through the interface of factory control computer 70 through line 276 to CPU 71 of computer 70 which is in a fabrication plant 90.

The factory control computer system 70 comprises a CPU 71, a terminal 77 with monitor 72 and keyboard 73 connected to the CPU 71 for receiving/sending data respectively from/to the CPU 71. A random access memory 75 and a DASD 74 associated with the CPU 71 are shown connected for bidirectional communication with CPU 71.

Line 86 connects from CPU 71 to line 186 which connects through the interface of factory control computer 70 out to the shop floor 87 elements of the system.

Figure 3:
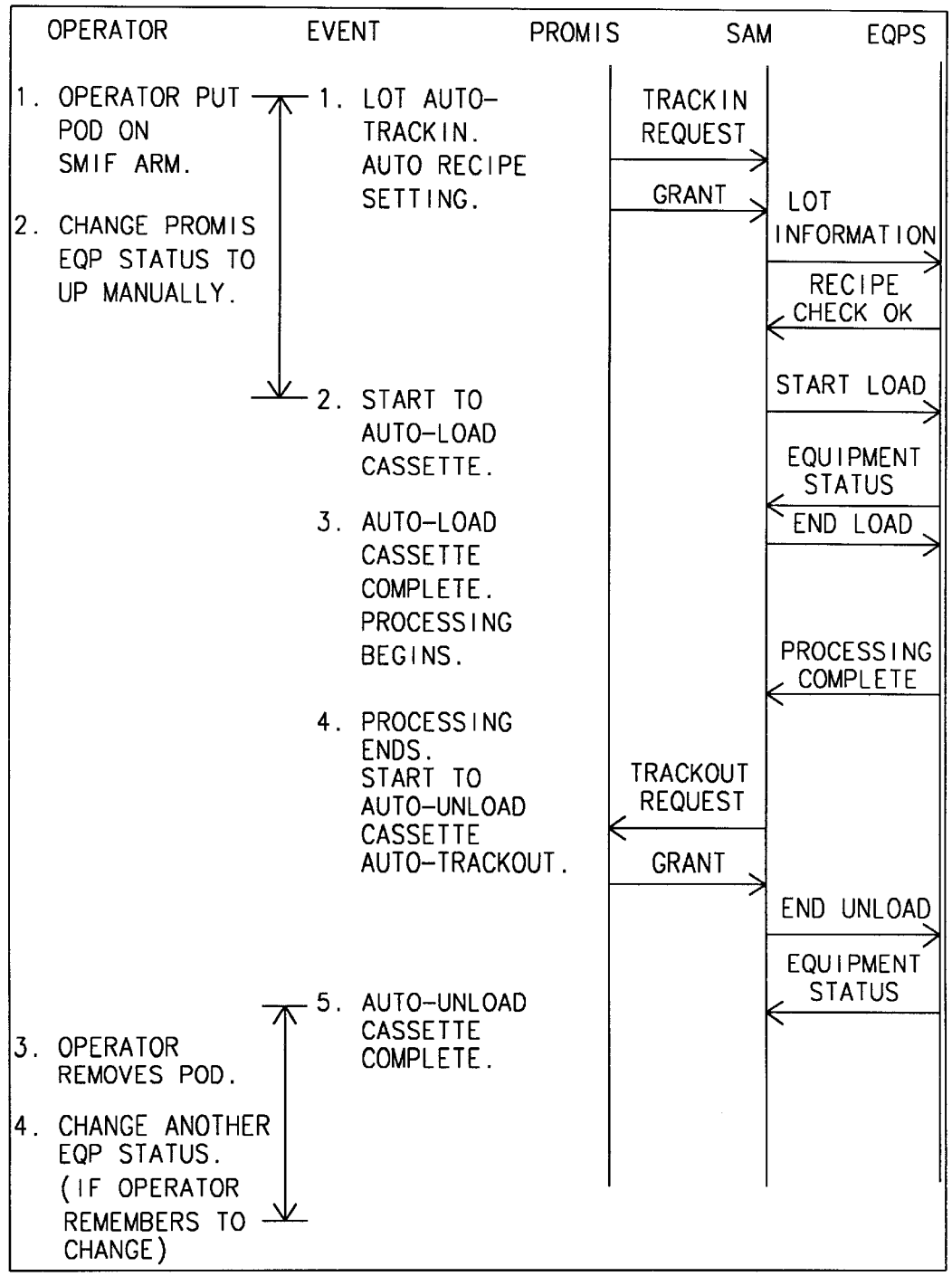
FIG. 3 is a chart showing a control system for operating a system considered before reaching the system shown in FIG. 4.
Figure 4:
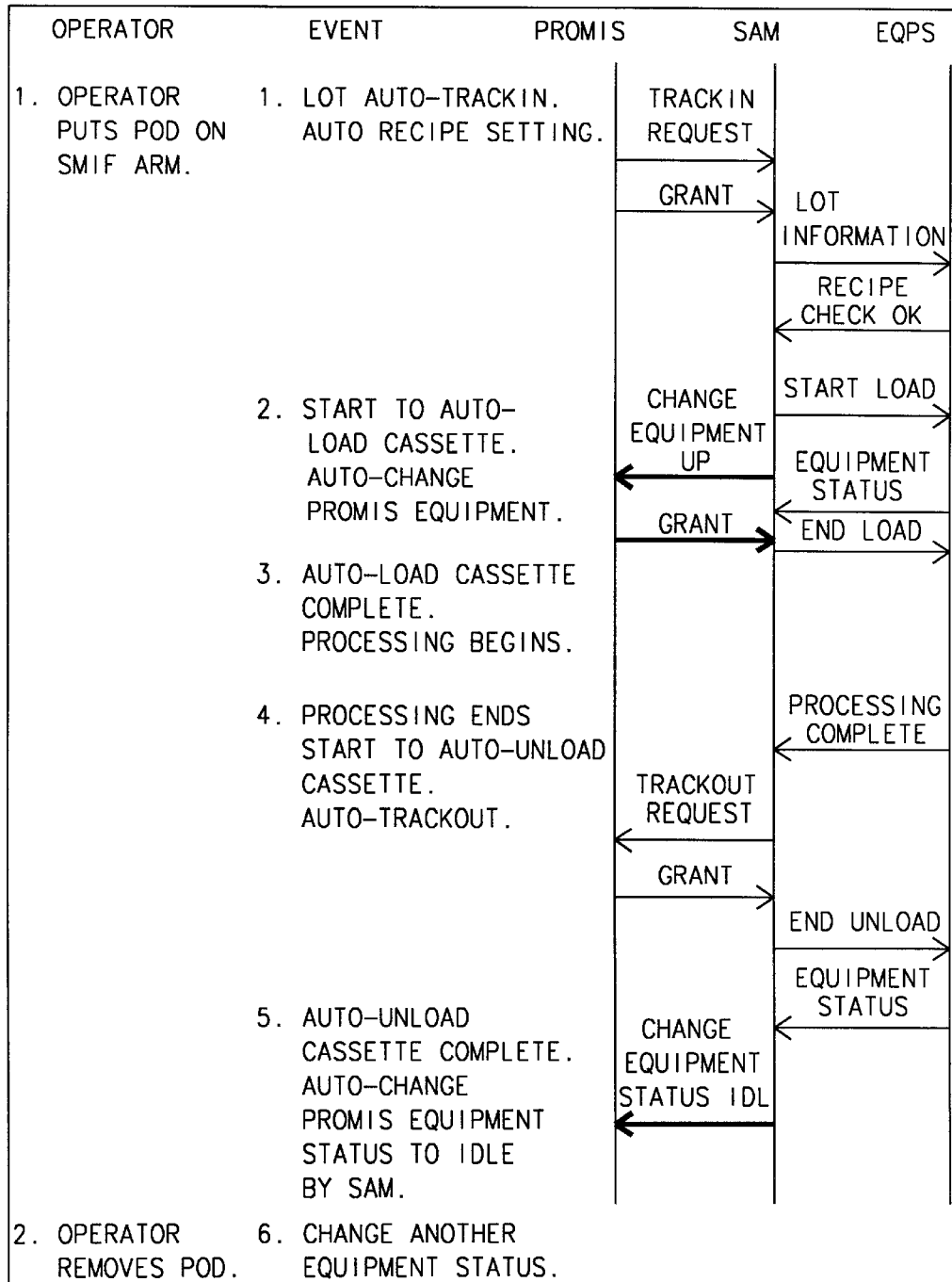
FIG. 4 is a chart showing a control system for operating a system in accordance with the system of this invention.

FIG. 3 is a chart showing a control system for operating a system considered before reaching the system shown in FIG. 4.

In FIG. 3, the operator performs the four steps as follows:

| Operator | Event |
| --- | --- |
| 1. Operator put pod on SMIF arm | 1. Lot auto-tracking Auto recipe setting |
| 2. Change PROMIS EQP status to UP by manual operation. | |
| | 2. Start to auto-load cassette |
| | 3. Auto-load cassette complete Processing begins |
| | 4. Processing ends Start to auto-unload cassette. Auto trackout |
| | 5. Auto-unload cassette complete |
| 3. Operator removes pod. | |
| 4. Change another EQP status (if operator remembers to change). | |

The PROMIS, SAM, and EQPS information is tracked alongside the above entries in FIG. 3.

FIG. 4 is a chart showing a control system for operating a system in accordance with the system of this invention, as follows:

| Operator | Event |
| --- | --- |
| 1. Operator puts pod on SMIF arm | 1. Lot auto-trackin Auto recipe setting |
| | 2. Start to auto-load cassette Auto-change PROMIS equipment status to UP by SAM |
| | 3. Auto-load cassette complete Bid Load Processing begin |
| | 4. Processing end Start to auto-unload cassette Auto trackout |
| | 5. Auto-unload cassette complete Auto-change PROMIS equipment status to IDLE by SAM |
| 2. Operator remove pod | Change another equipment status |

The PROMIS, SAM, and EQPS information is tracked alongside the above entries in FIG. 4.

It can be seen that in the chart shown in FIG. 4, there are only two operator functions, which is two less operator 5 functions. In addition, there is an Auto-change of PROMIS equipment status to the UP status in event 2 and to the IDLE status in event 5 with the SAM (Smart Arm Master) interface.

In addition, it can be seen by the bold arrow line from SAM to PROMIS that the system changes the equipment status to UP after event 2; and that PROMIS sends back a concurrence message that the request from SAM has been granted (approved.)

After event 5, the SAM system sends a change equipment to the IDLE status.

Figure 5:
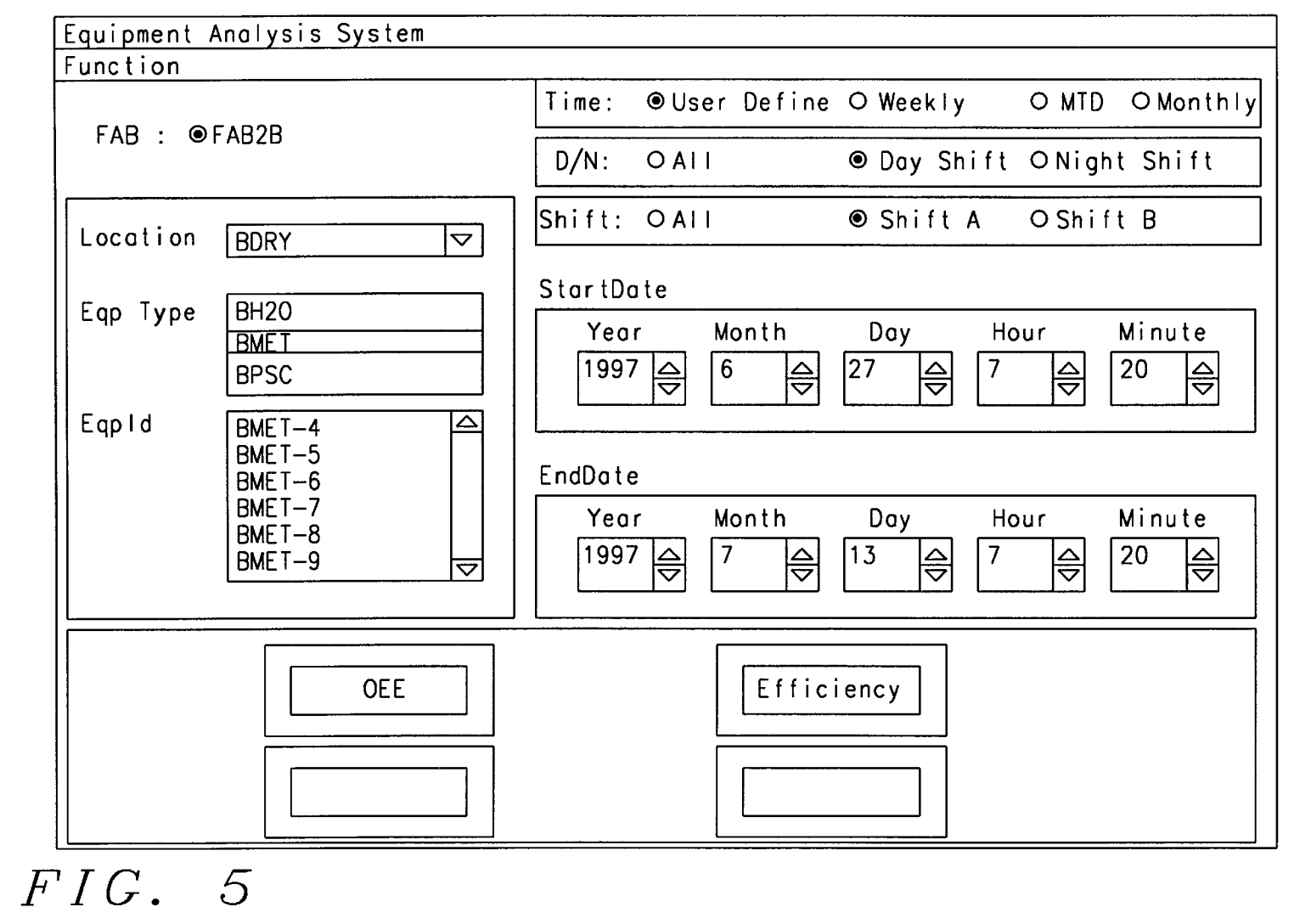

FIG. 5 shows a computer screen of an OEE Reporting System operated upon a personal computer based system employed in controlling the systems of FIGS. 1 and 2.

FIG. 6 shows another computer screen of the OEE Reporting System which provides an "OEE Report help to trace productivity. The screen has the data as follows:

| OEE Function Time: 11-Jun-1997 7:20:00 - 27-Jun-1997 7:20:00 | | | | | | | | | | | | | | |
|---|---|---|---|---|---|---|---|---|---|---|---|---|---|---|
| | | MET1 | MET10 | MET11 | MET12 | MET2 | MET3 | MET4 | MET5 | MET6 | MET7 | MET8 | MET9 | AVG |
| Overall Equipment Effectiveness (OEE) | | 71.98 | 93.53 | 77.26 | 59.10 | 69.86 | 74.81 | 58.78 | 72.25 | 73.40 | 70.61 | 69.73 | 81.41 | 72.73 |
| Availability | | 82.28 | 86.52 | 88.39 | 76.62 | 85.23 | 83.69 | 65.38 | 78.90 | 75.38 | 80.00 | 77.80 | 80.97 | 80.10 |
| Performance Efficiency | | 88.14 | 108.40 | 88.55 | 77.22 | 82.68 | 90.02 | 90.37 | 92.57 | 97.93 | 89.00 | 89.86 | 101.37 | 91.34 |
| Rate Efficiency | | 105.03 | 112.97 | 96.49 | 85.89 | 91.30 | 96.73 | 109.15 | 96.64 | 102.77 | 95.23 | 97.35 | 105.70 | 99.60 |
| Operation Efficiency | | 83.92 | 95.95 | 91.76 | 89.91 | 90.56 | 93.06 | 82.80 | 95.79 | 95.30 | 93.46 | 92.31 | 95.91 | 91.73 |
| Rate of Quality | | 99.26 | 99.73 | 98.72 | 99.89 | 99.14 | 99.30 | 99.49 | 98.92 | 99.43 | 99.17 | 99.73 | 99.18 | 99.33 |
| Demand Efficiency | | 100.00 | 100.00 | 100.00 | 100.00 | 100.00 | 100.00 | 100.00 | 100.00 | 100.00 | 100.00 | 100.00 | 100.00 | 100.00 |
| PRODUCTIVE TIME | UP | 69.05 | 83.02 | 81.11 | 68.89 | 77.19 | 77.88 | 54.13 | 75.58 | 71.83 | 74.77 | 71.82 | 77.65 | 73.58 |
| | BKUP | 0.00 | 0.00 | 0.00 | 0.00 | 0.00 | 0.00 | 0.00 | 0.00 | 0.00 | 0.00 | 0.00 | 0.00 | 0.00 |
| ENGINEERING | TEST | 4.67 | 0.00 | 0.66 | 0.18 | 0.04 | 0.00 | 7.52 | 0.00 | 0.55 | 0.00 | 0.06 | 0.00 | 1.14 |
| STANDBY | LOS WAIT | | | | | | | | | | | | | |
| | NO TE | 2.70 | 3.23 | 5.21 | 5.07 | 4.19 | 3.27 | 2.71 | 1.90 | 2.46 | 4.49 | 4.93 | 2.36 | 3.54 |
| | NO WIP LOAD | 0.80 | 0.00 | 0.00 | 0.30 | 0.00 | 0.00 | 0.00 | 0.04 | 0.00 | 0.00 | 0.00 | 0.00 | 0.10 |
| | LOST OTHERS | 5.06 | 0.27 | 1.42 | 2.19 | 3.82 | 2.53 | 1.01 | 1.37 | 0.54 | 0.74 | 0.99 | 0.95 | 1.74 |
| | WAIT PM | 0.00 | 0.00 | 0.00 | 0.00 | 0.00 | 0.00 | 0.00 | 0.00 | 0.00 | 0.00 | 0.04 | 0.06 | 0.01 |
| | WAIT ENG | 2.03 | 0.85 | 1.00 | 2.49 | 0.48 | 1.29 | 1.26 | 2.19 | 1.92 | 4.43 | 2.05 | 1.92 | 1.83 |
| | WAIT OCAP | 0.26 | 0.00 | 0.00 | 0.00 | 0.00 | 0.00 | 0.28 | 0.39 | 0.04 | 0.00 | 0.14 | 0.16 | 0.11 |
| | WAIT OTHERS | 5.26 | 4.23 | 2.42 | 3.35 | 3.86 | 4.39 | 1.64 | 3.18 | 2.67 | 6.42 | 2.18 | 3.72 | 3.61 |
| SCHEDULED DOWNTIME | MH | | | | | | | | | | | | | |
| | EQ OTHER CHAM | 0.00 | 0.00 | 0.00 | 0.00 | 0.00 | 0.00 | 0.00 | 0.00 | 0.00 | 0.00 | 0.00 | 0.00 | 0.00 |
| | TURN OTHER TYP | 0.00 | 0.00 | 0.00 | 0.00 | 0.00 | 0.00 | 0.00 | 0.00 | 0.00 | 0.00 | 0.00 | 0.00 | 0.00 |
| | PM | 3.48 | 3.33 | 2.07 | 3.01 | 3.52 | 3.90 | 9.34 | 6.29 | 9.03 | 4.40 | 5.90 | 5.45 | 4.98 |
| | MON | 4.72 | 5.26 | 5.88 | 5.43 | 6.14 | 5.00 | 7.94 | 6.53 | 4.91 | 4.94 | 6.96 | 5.90 | 5.80 |
| UNSCHEDULED DOWNTIME | DOWN | 0.88 | 0.28 | 1.33 | 5.38 | 0.00 | 1.82 | 14.32 | 2.09 | 3.11 | 0.42 | 4.83 | 0.87 | 2.94 |
| | FAC | 1.33 | 0.45 | 0.55 | 4.49 | 0.81 | 0.80 | 0.00 | 0.25 | 2.78 | 0.99 | 2.70 | 0.96 | 1.34 |
| NON-SCHEDULE | OFF | 0.00 | 0.00 | 0.00 | 0.00 | 0.00 | 0.00 | 0.00 | 0.00 | 0.00 | 0.00 | 0.00 | 0.00 | 0.00 |

F1 EQP Micr... Graphics Serve Microsoft PM 01–33 OEE

Figure 7:
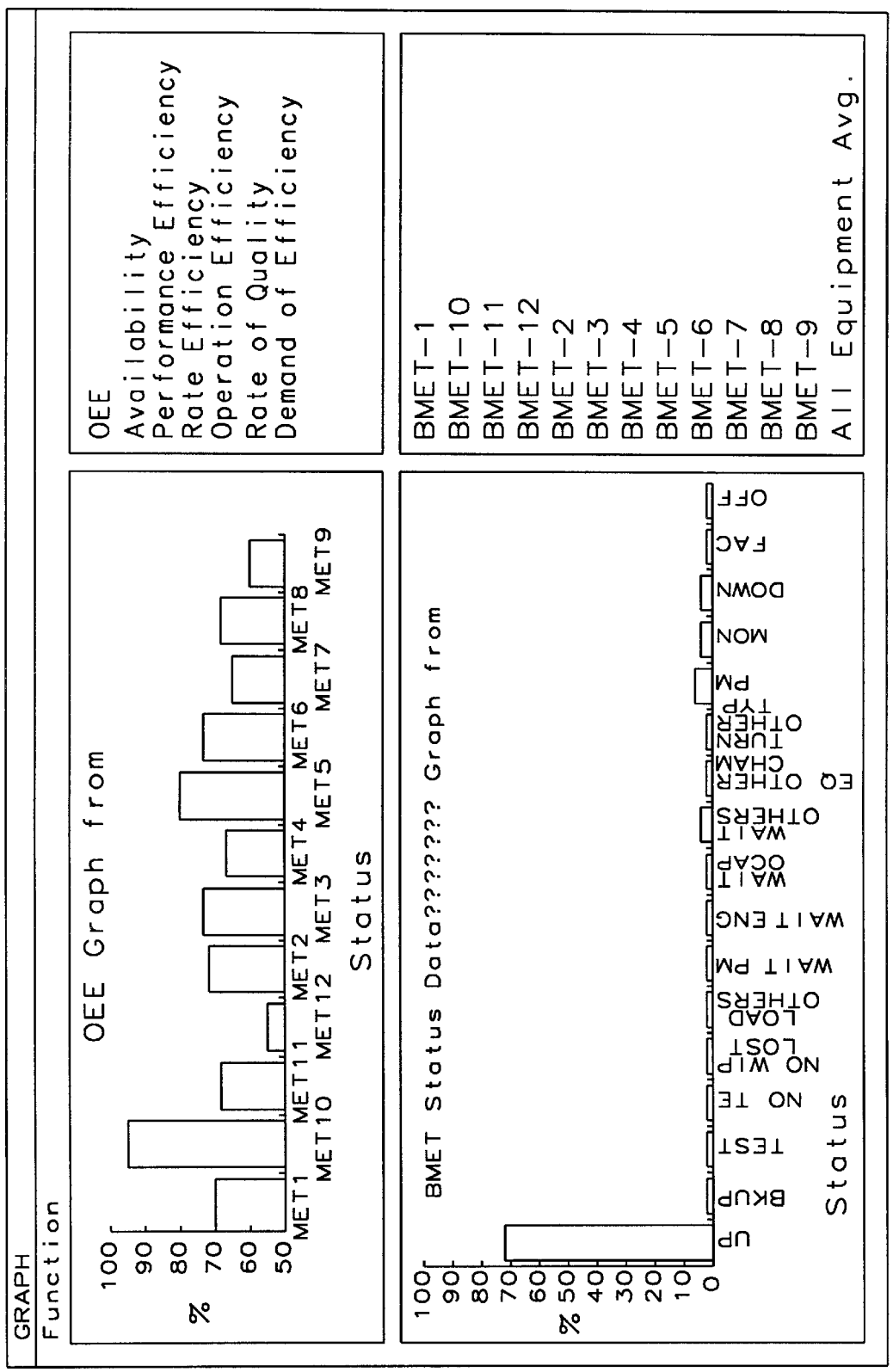
FIG. 7 shows another computer screen of the OEE Reporting System which provides a histogram of on the computer screen which facilitates realization of the difference between EQPS.

FIG. 7 shows another computer screen of the OEE Reporting System which provides a histogram of on the computer screen which facilitates realization of the difference between EQPS.

Figure 8:
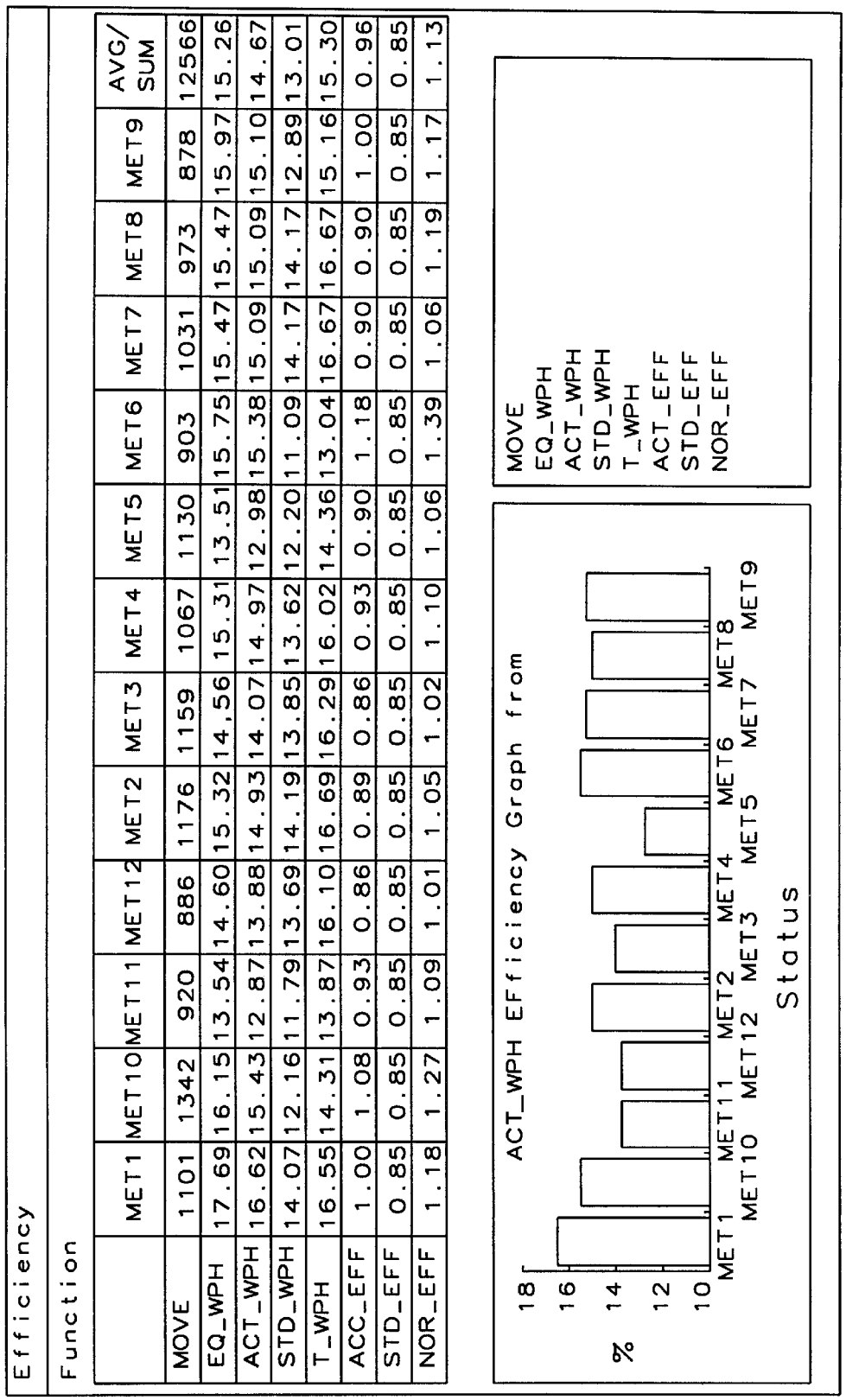
FIG. 8 shows another computer screen of the OEE Reporting System which provides a computer screen which has the data including "EFF & WPH Subsystem" help to know average actual WPH, standard WPH & EQP WPH.

FIG. 8 shows another computer screen of the OEE Reporting System which provides a computer screen which has the data as follows:

| "EFF & WPH Subsystem" help to know average actual WPH, standard WPH & EQP WPH *WPH: Wafers per hour Efficiency Function Time:- 27-Jun-1997 7:20:00 - 13-Jul-1997 7:20:00 Day/ShiftA | | | | | | | | | | | | | |
|---|---|---|---|---|---|---|---|---|---|---|---|---|---|
| | MET1 | MET10 | MET11 | MET12 | MET2 | MET3 | MET4 | MET5 | MET6 | MET7 | MET8 | MET9 | AVG/SUM |
| MOVE | 1101 | 1342 | 920 | 886 | 1176 | 1159 | 1067 | 1130 | 903 | 1031 | 973 | 878 | 12566 |
| EQ_WPH | 17.69 | 16.15 | 13.54 | 14.60 | 15.32 | 14.56 | 15.31 | 13.51 | 15.75 | 15.47 | 15.20 | 15.97 | 15.26 |
| ACT_WPH | 16.62 | 15.43 | 12.87 | 13.88 | 14.93 | 14.07 | 14.97 | 12.98 | 15.38 | 15.09 | 14.77 | 15.10 | 14.67 |
| STD_WPH | 14.07 | 12.16 | 11.79 | 13.69 | 14.19 | 13.85 | 13.62 | 12.20 | 11.09 | 14.17 | 12.37 | 12.89 | 13.01 |
| T_WPH | 16.55 | 14.31 | 13.87 | 16.10 | 16.69 | 16.29 | 16.02 | 14.36 | 13.04 | 16.67 | 14.55 | 15.16 | 15.30 |
| ACT_EFF | 1.00 | 1.08 | 0.93 | 0.86 | 0.69 | 0.86 | 0.93 | 0.90 | 1.18 | 0.90 | 1.02 | 1.00 | 0.96 |

-continued

"EFF & WPH Subsystem"
help to know average actual WPH, standard WPH & EQP WPH *WPH: Wafers per hour
Efficiency
Function Time:- 27-Jun-1997 7:20:00 - 13-Jul-1997 7:20:00 Day/ShiftA

|  | MET1 | MET10 | MET11 | MET12 | MET2 | MET3 | MET4 | MET5 | MET6 | MET7 | MET8 | MET9 | AVG/SUM |
|---|---|---|---|---|---|---|---|---|---|---|---|---|---|
| STD_EFF | 0.85 | 0.85 | 0.85 | 0.85 | 0.85 | 0.85 | 0.85 | 0.85 | 0.85 | 0.85 | 0.65 | 0.85 | 0.85 |
| NOR_EFF | 1.18 | 1.27 | 1.09 | 1.01 | 1.05 | 1.02 | 1.10 | 1.06 | 1.39 | 1.06 | 1.19 | 1.17 | 1.13 |

En F1_EQP - M1... Microsoft Pc,... Graphics Server Microsof Wo.. Efficiency PM 0153

FIG. 9 shows another computer screen of the OEE Reporting System which provides a computer screen which has the data as follows: "Best WPH Subsystem" help to find improvement opportunity of EQP & recipe setting Function
Time: 25 JUL-1997 07:20:00 - 07-AUG-1997 07:20:00

| RECPID | MET-1 WPH | GAP | MET-10 WPH | GAP | MET-11 WPH | GAP | MET-12 WPH | GAP | MET-2 WPH | GAP | MET-3 WPH | GAP | MET-4 WPH | GAP |
|---|---|---|---|---|---|---|---|---|---|---|---|---|---|---|
| 1161 | 19.299 | 0 | 18.239 | 1.060 |  |  | 17.447 | 1.852 | 16.612 | 2.687 | 17.572 | 1.727 | 17.577 | 1.722 |
| 1262 | 19.113 | 0 | 18.155 | 0.958 | 17.987 | 1.126 | 17.442 | 1.671 | 116.603 | 2.51 | 17.55 | 1.563 | 17.608 | 1.505 |
| 2146 | 14.857 | 0 |  |  |  |  |  |  |  |  |  |  |  |  |
| 2154 |  |  | 15.149 | 0.582 | 15.137 | 0.594 |  |  | 13.996 | 1.735 | 15.731 | 0.000 | 14.817 | 0.914 |
| 2246 |  |  |  |  |  |  |  |  |  |  |  |  |  |  |
| 2255 |  |  |  |  |  |  |  |  |  |  |  |  |  |  |
| 2256 |  |  | 15.060 | 2.180 | 14.948 | 2.292 | 14.519 | 2.721 | 14.576 | 2.664 | 14.576 | 2.664 | 14.579 | 2.661 |
| 2260 |  |  |  |  |  |  |  |  |  |  |  |  |  |  |
| 2266 | 14.904 | 0 |  |  |  |  |  |  |  |  |  |  |  |  |
| 3152 |  |  | 15.163 | 4.220 | 15.101 | 4.282 |  |  |  |  |  |  |  |  |
| 3153 |  |  |  |  |  |  |  |  |  |  |  |  |  |  |
| 3154 |  |  |  |  |  |  |  |  |  |  |  |  |  |  |
| 3252 |  |  | 15.109 | 0.121 | 15.054 | 0.176 |  |  |  |  |  |  |  |  |
| 3253 |  |  |  |  |  |  |  |  |  |  |  |  |  |  |
| 3254 |  |  |  |  |  |  |  |  |  |  |  |  |  |  |
| 3353 |  |  |  |  |  |  |  |  |  |  |  |  |  |  |
| 3354 |  |  | 18.026 | 0.000 |  |  |  |  |  |  |  |  |  |  |
| 3356 |  |  | 15.023 | 0.000 | 14.881 | 0.142 |  |  |  |  |  |  |  |  |
| 3366 |  |  | 18.072 | 0.001 | 17.899 | 0.174 |  |  |  |  |  |  |  |  |

Two monthly reports follow with the second showing the advantages of the system of FIGS. 1, 2, and 4–9 in accordance with this invention.

M/C Efficiency Monthly Report
M/C Efficiency Monthly Report:
from 30-APR-1997 19:20:00 to 31-MAY-1997 19:20:00
Report G

| LOCATION | EQPTYPE | EQPID | MOVE | ACT WPH | STD WPH | T WPH | ACT EFF | STD EFF | NOR EFF |
|---|---|---|---|---|---|---|---|---|---|
|  | BDRY-MET | BMET-1-A | 8428 | 16.1 | 14.4 | 16.9 | 0.9536 | 0.8500 | 1.1219 |
|  |  | BMET-10A | 8070 | 13.9 | 11.9 | 14.1 | 0.9858 | 0.8500 | 1.1598 |
|  |  | BMET-11A | 7940 | 14.2 | 12.3 | 14.5 | 0.9794 | 0.8500 | 1.1522 |
|  |  | BMET-2-A | 8235 | 14.1 | 14.4 | 16.9 | 0.8322 | 0.8500 | 0.9791 |
|  |  | BMET-3-A | 9304 | 14.8 | 14.1 | 16.6 | 0.8961 | 0.8500 | 1.0530 |
|  |  | BMET-4-A | 78S9 | 15.2 | 13.0 | 15.2 | 0.9995 | 0.8500 | 1.1759 |
|  |  | BMET-4-D | 24 | 11.0 | 14.4 | 17.0 | 0.0024 | 0.8500 | 0.0028 |
|  |  | BMET-5-A | 8495 | 14.0 | 13.6 | 16.1 | 0.8691 | 0.8500 | 1.0225 |
|  |  | BMET-6-A | 8812 | 14.0 | 13.3 | 15.6 | 0.8961 | 0.8500 | 1.0542 |
|  |  | BMET-7-A | 8657 | 14.3 | 13.4 | 15.8 | 0.9039 | 0.8500 | 1.0634 |
|  |  | BMET-8-A | 7492 | 14.9 | 13.2 | 15.6 | 0.9610 | 0.8500 | 1.1306 |
|  |  | BMET-9-A | 8386 | 14.5 | 12.4 | 14.6 | 0.9983 | 0.8500 | 1.1745 |
|  | ***AUG. |  | 91703 | 13.3 | 13.2 | 15.6 | 0.8526 | 0.8500 | 1.0031 |

M/C Availability Monthly Report
FAB2B M/C Availability Monthly Report:
from 30-APR-1997 19:20:00 to 31-MAY-1997 19:20:00

| EQPID | ACT_WPH | UP | BKUP | TEST/ENG | LOST | MFGHOLD | MOM/TPH | PM | WAIT | DOWN | FAC | MTBF | MTTR | AUL |
|---|---|---|---|---|---|---|---|---|---|---|---|---|---|---|
| BMET-1-A | 16.1 | 75.4 | 0.0 | 1.1 | 3.7 | 0.4 | 5.8 | 3.6 | 4.4 | 4.3 | 1.3 | 94.9 | 5.4 | 80.3 |
| BMET-1-B | 0.0 | 65.3 | 0.0 | 11.3 | 3.7 | 0.4 | 5.1 | 3.6 | 4.6 | 4.8 | 1.3 | 81.4 | 5.1 | 80.2 |
| * AUG | 8.1 | 70.3 | 0.0 | 6.2 | 3.7 | 0.4 | 5.5 | 3.6 | 4.5 | 4.6 | 1.3 | 88.1 | 5.2 | 80.2 |
| BMET-2-A | 14.1 | 78.0 | 0.0 | 1.1 | 2.5 | 0.4 | 8.3 | 2.9 | 3.4 | 2.8 | 1.6 | 193.6 | 7.0 | 80.6 |
| BMET-2-B | 0.0 | 79.2 | 0.0 | 1.1 | 2.5 | 0.4 | 7.4 | 2.9 | 3.5 | 1.5 | 1.6 | 199.2 | 3.6 | 82.8 |
| * AUG | 7.1 | 78.6 | 0.0 | 0.6 | 2.5 | 0.4 | 7.8 | 2.9 | 3.4 | 2.1 | 1.6 | 198.4 | 5.3 | 81.7 |
| BMET-3-A | 14.8 | 84.6 | 0.0 | 0.0 | 3.6 | 0.2 | 5.7 | 4.1 | 1.4 | 0.1 | 0.3 | 629.1 | 0.8 | 88.2 |
| BMET-3-B | 0.0 | 84.3 | 0.0 | 0.2 | 3.5 | 0.2 | 5.7 | 4.1 | 1.6 | 0.1 | 0.3 | 628.6 | 0.8 | 88.0 |

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. Apparatus comprising a manufacturing control and reporting system for manufacturing of semiconductor devices comprising:

a system for loading a mechanical article handling device in the semiconductor manufacturing system, means for providing an automatic check-in and means for changing equipment status to an UP status, means for automatically checking whether the article handling system is empty, means for automatically changing the system status to an IDLE status, said apparatus providing automatic check-in, and said apparatus providing track-out subsequent to processing of the workload by a plant followed by automatically checking whether the article handling system is empty, then said system checking whether a TE has arrived, and said system checking whether the TE has reloaded the article handling system.

2. Apparatus comprising a manufacturing control and reporting system for manufacturing of semiconductor devices comprising:

loading a mechanical article handling device in a semiconductor manufacturing system, then providing an automatic check-in and changing equipment status to an UP status, then automatically checking whether the article handling system is empty, and then automatically changing the system status to an IDLE status, said apparatus provides automatic check-in, providing track-out subsequent to processing of the workload by a plant followed by automatically checking whether the article handling system is empty, then checking whether a TE has arrived, and then checking whether the TE has reloaded the article handling system.

* * * * *